(12) United States Patent
Wang et al.

(10) Patent No.: US 10,577,472 B2
(45) Date of Patent: *Mar. 3, 2020

(54) THERMOPLASTIC PARTICLE-TOUGHENED PREPREG FOR USE IN MAKING COMPOSITE PARTS WHICH TOLERATE HOT AND WET CONDITIONS

(71) Applicant: Hexcel Corporation, Dublin, CA (US)

(72) Inventors: Yen-Seine Wang, San Ramon, CA (US); Gordon Emmerson, Dublin, CA (US)

(73) Assignee: HEXCEL CORPORATION, Dublin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/158,151

(22) Filed: Oct. 11, 2018

(65) Prior Publication Data

US 2019/0233602 A1 Aug. 1, 2019

Related U.S. Application Data

(63) Continuation-in-part of application No. 15/886,008, filed on Feb. 1, 2018, now Pat. No. 10,472,479.

(51) Int. Cl.
*C08J 5/24* (2006.01)
*B32B 27/38* (2006.01)
*C08G 59/32* (2006.01)
*C08G 59/38* (2006.01)
(Continued)

(52) U.S. Cl.
CPC .................. *C08J 5/24* (2013.01); *B32B 27/08* (2013.01); *B32B 27/38* (2013.01); *C08G 59/32* (2013.01);
(Continued)

(58) Field of Classification Search
CPC . B32B 27/38; C08J 5/24; C08G 59/32; C08G 59/3227; C08G 59/38; C08G 59/50; C08G 59/5033
(Continued)

(56) References Cited

U.S. PATENT DOCUMENTS 5,610,209 A 3/1997 Kiyono
9,683,072 B2 6/2017 Misumi et al.
(Continued)

FOREIGN PATENT DOCUMENTS

JP 62036421 A * 2/1987 ............. C08G 59/32
WO 2017038880 3/2017
(Continued)

OTHER PUBLICATIONS

Machine translation of JP-62036421-A (no date).*
(Continued)

*Primary Examiner* — Michael J Feely
(74) *Attorney, Agent, or Firm* — W. Mark Bielawski; David J. Oldenkamp

(57) ABSTRACT

Pre-impregnated composite material (prepreg) that can be cured/molded to form aerospace composite parts that are designed to tolerate hot and wet conditions. The prepreg includes fibers and an uncured resin. The uncured resin includes an epoxy component that is a combination of a trifunctional epoxy resin, a tetra functional epoxy resin and a solid epoxy resin. The resin includes polyethersulfone and a thermoplastic particle component. The uncured resin also includes a curing agent.

15 Claims, 1 Drawing Sheet

(51) Int. Cl.
*C08G 59/50* (2006.01)
*C08J 5/04* (2006.01)
*C08L 81/06* (2006.01)
*B32B 27/08* (2006.01)
*B64D 29/00* (2006.01)

(52) U.S. Cl.
CPC ............. *C08G 59/38* (2013.01); *C08G 59/50* (2013.01); *C08J 5/042* (2013.01); *C08L 81/06* (2013.01); *B64D 29/00* (2013.01); *C08J 2363/00* (2013.01); *C08J 2363/02* (2013.01); *C08J 2363/04* (2013.01); *C08J 2481/06* (2013.01)

(58) Field of Classification Search
USPC ...... 428/297.4, 413; 523/427, 428; 525/524, 525/525, 526
See application file for complete search history.

(56) References Cited

U.S. PATENT DOCUMENTS

| | | |
|---|---|---|
| 9,695,312 B2 | 7/2017 | Mortimer et al. |
| 2010/0062211 A1* | 3/2010 | Kawazoe ............. C08G 59/504 428/116 |
| 2010/0087582 A1 | 4/2010 | Wang et al. |
| 2011/0049426 A1 | 3/2011 | Patel et al. |
| 2011/0118386 A1* | 5/2011 | Wang ..................... C08G 59/44 523/400 |
| 2011/0184091 A1 | 7/2011 | Mizuki et al. |
| 2014/0135443 A1 | 5/2014 | Aerts et al. |
| 2015/0252182 A1 | 9/2015 | Wang |
| 2016/0362528 A1 | 12/2016 | Wang et al. |
| 2017/0369663 A1 | 12/2017 | Zhu et al. |
| 2019/0233601 A1* | 8/2019 | Wang ..................... B64D 29/00 |

FOREIGN PATENT DOCUMENTS

| | | |
|---|---|---|
| WO | 20170033056 | 3/2017 |
| WO | 2017/163129 | 9/2017 |

OTHER PUBLICATIONS

WO2017/038880—English Translation.
International Search Report and Written Opinion for PCT Patent Application No. PCT/US2019/013794, dated Apr. 6, 2019.

* cited by examiner

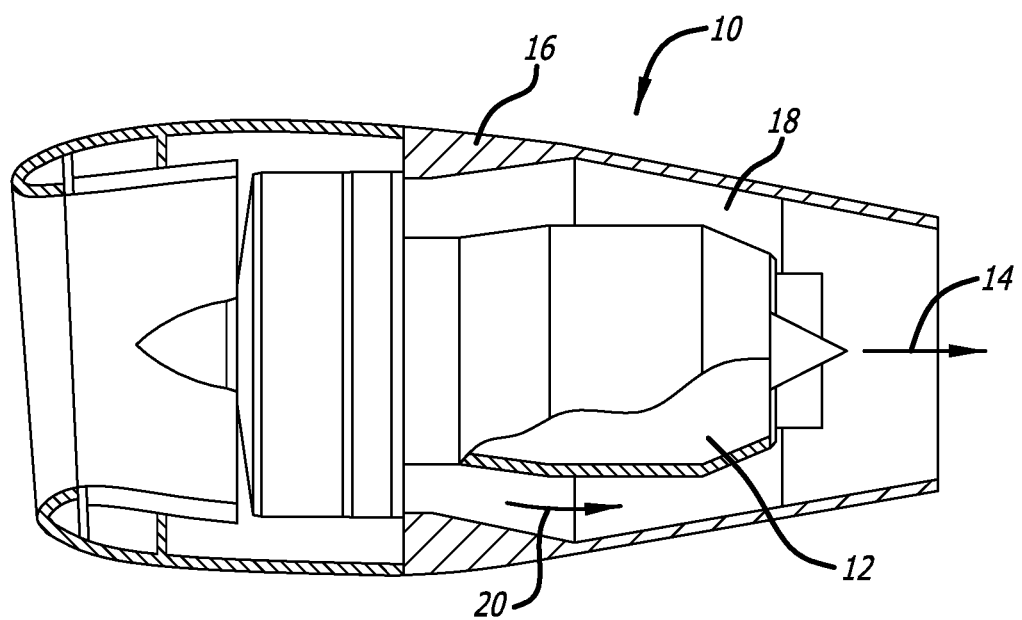

THERMOPLASTIC PARTICLE-TOUGHENED PREPREG FOR USE IN MAKING COMPOSITE PARTS WHICH TOLERATE HOT AND WET CONDITIONS

This application is a continuation-in-part of U.S. Ser. No. 15/886,008, filed on Feb. 1, 2018.

BACKGROUND OF THE INVENTION

1. Field of the Invention

The present invention relates generally to pre-impregnated composite material (prepreg) that is used in making high performance composite parts that are especially well suited for use as aerospace components. The present invention is more particularly directed to prepreg that is used to make aerospace composite parts or structures that must tolerate simultaneous exposure to hot temperatures and wet conditions.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part or structure is of critical importance.

Pre-impregnated composite material (prepreg) is used widely in the manufacture of composite parts. Prepreg is a combination that typically includes uncured resin and fibers, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network affect the structural properties of the part.

Prepreg is a preferred material for use in manufacturing load-bearing or primary structural parts and particularly aerospace primary structural parts, such as wings, fuselages, bulkheads and control surfaces. It is important that these parts have sufficient strength, damage tolerance and other requirements that are routinely established for such parts and structures. The nacelle, which surrounds the jet engine, is a unique structural component of the aircraft due to the nacelle's close proximity to a significant heat source and the exposure of the nacelle to exterior environmental elements. Many of the composite parts and structures that are present in the nacelle must be able to tolerate both hot and wet conditions.

The fibers that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber configurations are combined with a carefully controlled amount of uncured resin. The resulting prepreg is typically placed between protective layers and rolled up for storage or transport to the manufacturing facility.

The compressive strength of a cured composite part is dictated by the individual properties of the reinforcing fiber and matrix resin, as well as the interaction between these two components. In addition, the fiber-resin volume ratio, as well as the orientation of the prepreg in the part, are factors which affect compressive strength. In many aerospace applications, it is desirable that the composite part exhibit high compression strength. The open hole compression (OHC) test is a standard measure of the compression strength of a cured composite material.

In many aerospace applications, it is desirable that the composite part or structure exhibit high compression strength under both room temperature/dry conditions and hot/wet conditions. This is particularly important with respect to the composite parts and structures that are located near the jet engine where exposure to both high temperature and moisture is a consideration. However, attempts to keep compression strengths high under hot and wet conditions may result in negative effects on other desirable properties, such as the glass transition temperature of the uncured resin (sub Tg) used to form the prepreg.

The sub Tg of the uncured resin is related to the viscosity of the resin. If the sub Tg is too high, the uncured resin may become too viscous and unsuitable for use in forming, a prepreg. Likewise, if the sub Tg is too low, the uncured resin may have a viscosity that is unsuitably low for use as a prepreg resin. Accordingly, any attempt to alter a resin formulation to maximize the compressive strength of a resulting cured composite material under both room temperature/dry conditions and hot/wet conditions, must be weighed against the potential negative impact on the sub Tg of the uncured resin.

Resins that include an epoxy resin are commonly used in many aerospace prepregs. It is known that various combinations of different types of epoxy resins may result in wide variations in the properties of the uncured resin and final composite part. The curing agent used to cure the epoxy resin matrix can also substantially affect the properties of both the uncured resin and the final composite part.

When formulating an epoxy resin for use as the resin matrix in aerospace prepreg, it is difficult to predict if a new or altered combination of epoxy resin types and curatives will negatively or positively alter existing properties of the uncured resin and/or the cured composite part. This makes the process of altering resin formulations to achieve desired combinations of properties particularly problematic. An example of a desired combination of properties is where the uncured resin has a viscosity that is suitable for making prepreg and where the resulting prepreg is suitable for making jet engine nacelle parts and structures that must be able to tolerate hot and wet conditions.

It is also known to add a thermoplastic toughening agent to an epoxy prepreg resin. The toughening agent, such as polyether sulfone (PES) or polyetherimide (PEI), is dissolved in the epoxy resin before it is combined with fibers to form the prepreg. Thermoplastic toughened epoxy resins have been widely used in combination with carbon fiber to make aerospace prepreg. Varying the amount of toughening agent affects the sub Tg and viscosity of the uncured resin as well as properties of the resulting cured composite material.

It also is difficult to predict if altering the amount or type of toughening agent in an existing epoxy prepreg resin formulation will positively or negatively affect one or more properties of the uncured resin and/or the cured composite material. This issue becomes even more complex and unpredictable when altering other resin formulation variables, such as the amount and type(s) of epoxy resin and curing agents. Alterations in the resin formulation which provide one desired property can result in an undesirable negative effect on another property. For example, a formula alteration that increases the hot/wet OHC of the cured composite material to a desired level may result in a change in the sub Tg of the uncured resin that renders the resin unsuitable for use in making prepreg.

Existing aerospace prepregs are well suited for their intended purposes. However, there still is a continuing need to develop resins that have properties which are suitable for making aerospace prepreg where the prepreg is then used to make engine nacelle parts or structures where the compressive strength of the part or structure is not adversely affected by the hot and wet conditions present in the nacelle environment.

SUMMARY OF THE INVENTION

In accordance with the present invention, pre-impregnated composite material (prepreg) is provided that can be molded to form composite parts or structures that have high levels of compressive strength under both room temperature/dry conditions and hot/wet conditions.

The prepreg of the present invention is composed of fibers and an uncured resin. The uncured resin includes a resin component made up of a triglycidyl aminophenol epoxy resin, a tetrafunctional epoxy resin and a solid epoxy resin. The uncured resin further includes a thermoplastic toughening agent and a curing agent.

The present invention also covers methods for making the prepreg and methods for molding the prepreg into composite parts or structures that retain compressive strength when exposed to hot and wet conditions. The invention also covers the composite parts and structures that are made using the improved prepreg. The invention is particularly applicable to the parts and structures of aircraft engine nacelles.

It has been found that resins having the formulation, as set forth above, have a sub Tg and viscosity that is suitable for use in making prepreg and that the prepreg can be molded to form composite parts and structures that are able to tolerate the hot and wet conditions present in the environment of a jet engine nacelle.

The above described and many other features and attendant advantages of the present invention will become better understood by reference to the following detailed description when taken in conjunction with the accompanying drawings.

BRIEF DESCRIPTION OF THE DRAWINGS

FIG. 1 is a simplified sectional view of a jet engine which includes a nacelle that is composed of parts and structures made using prepreg in accordance with the present invention.

DETAILED DESCRIPTION OF THE INVENTION

Uncured epoxy resin compositions in accordance with the present invention may be used in a wide variety of situations where a thermoplastic-toughened epoxy resin matrix is desired. Although the uncured epoxy resin composition may be used alone, the compositions are used in this invention as a matrix resin that is combined with fibers to form a composite material composed of the fibers and the resin matrix. The composite material may be in the form of prepreg, partially cured prepreg or a completely cured final part made from one or more layers of prepreg. The term "uncured", when used herein in connection with: prepreg; the resin before impregnation into the fibers; the resin matrix that is formed when the fibers are impregnated with the resin; or composite material, is intended to cover items that may have been subjected to some curing, but which have not been completely cured to form the final composite part or structure.

Although the uncured composite materials may be used for any intended purpose, they are preferably used in making parts for aerospace vehicles, such as commercial and military aircraft. For example, the uncured composite materials may be used to make non-primary (secondary) aircraft structures. However the preferred use of the uncured composite material is for structural applications, such as primary aircraft structures. Primary aircraft structures or parts are those elements of either fixed-wing or rotary wing aircraft that undergo significant stress during flight and which are essential for the aircraft to maintain controlled flight.

The nacelle that surrounds the internal components of an aircraft jet engine is considered to be a primary aircraft structure. The prepreg of the present invention is particularly well suited for use in making the composite parts and structures that are present in the nacelle.

An exemplary jet engine is shown at 10 in the FIG. 1. The jet engine 10 includes a combustion core or hot section 12 which generates a primary hot air flow as represented by arrow 14. The hot air flow within the hot section or high temperature area 12 can be at temperatures ranging from 500° F. (260° C.) to 750° F. (399° C.) and higher depending upon the jet engine type and design. A nacelle structure 16 is located around the hot section 12 to provide an annular duct 18 through which cold secondary air flows as represented by arrow 20. The cold air flow enters the jet engine at a temperature equal to the outside air temperature and is heated as it passes through the annular duct 18 to temperatures that are equal to or slightly less than the temperature of the hot section 12.

The prepreg of the present invention may be used as a replacement for existing prepreg that is presently being used to form the composite parts and structures that are present in the nacelle 16. One aspect of the invention involves substituting the resin formulations of the present invention in place of existing resins that are being used to make prepreg that is molded to form nacelle parts or structures. Accordingly, the resin formulations of the present invention, are suitable for use as the matrix resin in conventional manufacturing and curing processes involving prepreg that is used to make the parts and structures associated with a jet engine nacelle.

The prepreg of the present invention is composed of fibers and an uncured resin matrix. The fibers can be any of the conventional fiber configurations that are used in the prepreg and composite sheet molding industry. Fiber types and configurations that are presently being used to make jet engine nacelle parts and structures are preferred. Carbon fibers are the preferred fiber type.

The uncured resin that is used to form the resin matrix includes an epoxy resin component that is made up of a trifunctional epoxy resin, a tetrafunctional epoxy resin and a solid epoxy resin. The resin further includes a thermoplastic toughening agent and a curing agent.

A preferred exemplary trifunctional epoxy resin is triglycidyl meta-aminophenol. Triglycidyl meta-aminophenol is available from Huntsman Advanced Materials (The Woodlands, Tex.) under the trade name Araldite MY0610. Triglycidyl meta-aminophenol is also available from Kukdo Chemicals (Seoul, South Korea) under the trade name KDS-8808 and from Sumitomo Chemical Co. (Osaka, Japan) under the trade name ELM-120. Another suitable trifunctional epoxy resin is triglycidyl para-aminophenol. Triglycidyl para-aminophenol is available from Huntsman Advanced Materials (The Woodlands, Tex.) under the trade name Araldite MY0510. Other trifunctional epoxy resins may be used provided that they have properties that are the same or similar to the properties of triglycidyl meta-aminophenol or triglycidyl para-aminophenol.

An exemplary tetrafunctional epoxy resin is N,N,N',N'-tetraglycidyl-4,4'-diaminodiphenyl methane (TGDDM) which is available as Araldite MY720 and MY721 from Huntsman Advanced Materials (The Woodlands, Tex.), or ELM 434 from Sumitomo Chemical Industries, Ltd. (Chuo, Tokyo). MY721 is preferred. Other tetrafunctional epoxy resins may be used provided that they have properties that are the same or similar to the properties of N,N,N',N'-tetraglycidyl-4,4'-diaminodiphenyl methane. For example, tetra-functional epoxy resins based on N,N,N',N'-tetraglycidyl-4,4'-methylenebis-benzenamine are also suitable. Such resins are available from Huntsman Advanced Materials (The Woodlands, Tex.) under the trade name Araldite MY9663.

It is preferred that that the weight ratio between the trifunctional and tetrafunctional resins be from 1.0:1.4 to 1.4:1.0. It is particularly preferred that the weight ratio between the trifunctional and tetrafunctional resins be from 1.2:1.0 to 1.2:1.0. Most preferred are formulations where the weight ratio between the trifunctional and tetrafunctional epoxy resins is 1.0:1.0.

The epoxy resin component also contains a solid epoxy resin. A solid epoxy resin is considered to be an epoxy resin that is solid or semi-solid at room temperature (20-25° C.) and which has a softening point of 40-90° C. A first exemplary solid epoxy resin has the following formula:

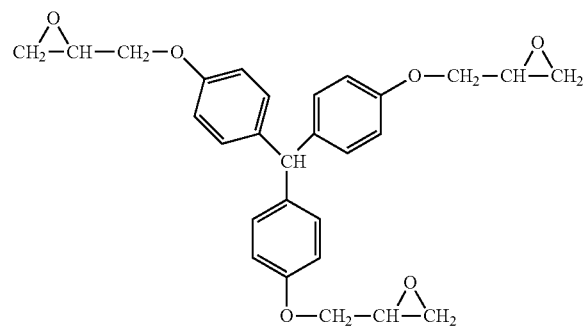 [SMILES: c1cc(C(c2ccc(OCC3CO3)cc2)c2ccc(OCC3CO3)cc2)ccc1OCC1CO1]

The first exemplary solid epoxy resin is available from Huntsman (The Woodlands, Tex.) under the trade name Tactix 742. Tactix 742 is semi-solid at room temperature and has a softening point of 48.9° C. The epoxy equivalent weight of Tactix 742 is 150-170 g/eq. The density of the resin at 25° C. is 1.23 g/cm³ with the flash point (closed cup) of the resin being 204° C.

A second exemplary solid epoxy resin has the following formula:

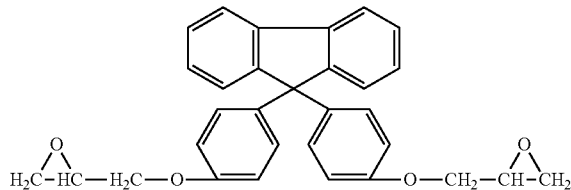 [SMILES: c1ccc2c(c1)-c1ccccc1C2(c1ccc(OCC2CO2)cc1)c1ccc(OCC2CO2)cc1]

The second exemplary resin is also known as 9,9-bis[4-(glycidyloxy)phenyl]fluorene. The second exemplary solid epoxy resin is available from Shin A T&C (Overland Park, Kans.) under the trade name SE 250. Other A third exemplary solid epoxy resin has the following formula:

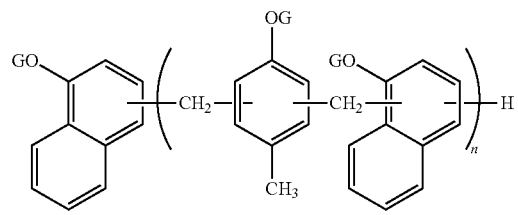

where G is a glycidyl or epoxide group and n=1.5 to 2.

The third exemplary solid epoxy resin is available from Nippon Kayaku (Tokyo, Japan) under the trade name NC7000H.

A fourth exemplary solid epoxy resin has the following formula:

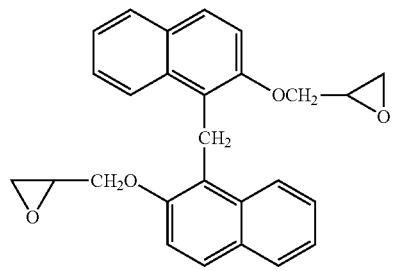

The fourth exemplary solid epoxy resin is available from DIC (Singapore) under the trade name HP4770. HP4770 is a naphthalene type epoxy that has an epoxy equivalent weight of 200-210 g/eq and a softening point of 67-77° C. HP4700, which is a naphthalene type epoxy that is available from DIC (Singapore), is also suitable.

The uncured resin includes at least one curing agent. Suitable curing agents are those which facilitate the curing of the epoxy-functional compounds and, particularly, facilitate the ring, opening polymerization of such epoxy compounds. Such curing agents include those compounds which polymerize with the epoxy-functional compound or compounds, in the ring opening polymerization thereof. Any of the curing agents that have been used to cure epoxy resins in aerospace prepregs that are used in making primary structures and parts may be suitable. Two or more such curing agents may be used in combination.

Exemplary preferred curing agents include 4,4'-diaminodiphenyl sulphone (4,4'-DDS) and 3,3'-diaminodiphenyl sulphone (3,3'-DDS), both commercially available from Huntsman (The Woodlands, Tex.). 3,3'-DDS is the preferred curing agent.

Accelerators may also being included to enhance or promote curing. Suitable accelerators are any of the crone compounds that have been commonly used in the curing of epoxy resins. Specific examples of accelerators, which may be used alone or in combination, include N,N-dimethyl, N'-3,4-dichlorphenyl urea (Diuron), N'-3-chlorphenyl urea (Monuron), and preferably N,N-(4-methyl-m-phenylene bis [N',N'-dimethylurea] (e.g. Dyhard UR500 available from Degussa).

The uncured resin matrix of the present invention also includes a thermoplastic toughening agent. Typically, the thermoplastic toughening agent is added to the resin mix as particles that are dissolved in the resin mixture by heating prior to addition of the curing agent. Once the thermoplastic agent is substantially dissolved in the hot resin precursor (i.e. the blend of epoxy resins), the precursor is cooled and the curing agent is added and mixed with the cooled resin blend.

A suitable toughening agent, by way of example, is particulate polyethersulfone (PES) that is sold under the trade name Sumikaexcel 5003P, and which is commercially available from Sumitomo Chemicals (New York, N.Y.). Alternatives to 5003P are Solvay polyethersulphone 105RP, or the non-hydroxyl terminated grades such as Solvay 1054P which is commercially available from Solvay Chemicals (Houston, Tex.). Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the resin precursor.

The uncured resin may also include additional ingredients, such as performance enhancing or modifying agents provided they do not adversely affect the viscosity of the uncured resin or the compressive strength of the cured composite material when measured under both room temperature/dry conditions and hot/wet conditions. The performance enhancing or modifying agents, for example, may be selected from core shell rubbers, flame retardants, wetting agents, pigments/dyes, UV absorbers, anti-fungal compounds, fillers, conducting particles, and viscosity modifiers.

Exemplary core shell rubber (CSR) particles are composed of a cross-linked rubber core, typically a copolymer of butadiene, and a shell composed of styrene, methyl methacrylate, glycidyl methacrylate and/or acrylonitrile. The core shell particles are usually provided as particles dispersed in an epoxy resin. The size range of the particles is typically from 50 to 150 nm. Suitable CSR particles are described in detail in U.S. Patent Publication US2007/0027233A1, the contents of which is hereby incorporated by reference. Preferred core shell particles are MX core-shell particles, which are available from Kane Ace (Pasadena, Tex.). A preferred core shell particle for inclusion in the uncured resin is Kane Ace MX-418. MX-418 is supplied as a 25 wt % suspension of core shell particles in a tetrafunctional epoxy resin. The core shell particles in MX-418 are polybutadiene (PBd) core shell particles which have an average particle size of 100 nanometers.

Suitable fillers include, by way of example, any of the following either alone or in combination: silica, alumina, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

Potato shaped graphite (PSG) particles are suitable conducting particles. The use of PSG particles in carbon fiber/epoxy resin composites is described in detail in U.S. Patent Publication No. US 2015/0179298 A1, the contents of which is hereby incorporated by reference. The PSG particles are commercially available from NGS Naturgraphit (Germany) as SG25/99.95 SC particles or from Nippon Power Graphite Company (Japan) as GHDR-15-4 particles. These commercially available PSG particles have average particle sizes of from 10-30 microns with the GHDR-15-4 particles having a vapor deposited coating of carbon on the outer surface of the PSG particles.

The uncured resin is made in accordance with standard prepreg matrix resin processing. In general, the trifunctional epoxy resin, tetrafunctional epoxy resin and solid epoxy resin are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. The curing agent, thermoplastic particles and additional ingredients, if any, are then mixed into the resin to form the final uncured resin that is further cooled to room temperature or below.

The uncured resin is applied to the fibrous reinforcement to form an uncured resin matrix surrounding the fibers in accordance with any of the known prepreg manufacturing techniques. The fibrous reinforcement may be fully or partially impregnated with the uncured resin. In an alternate embodiment, the uncured resin may be applied to the fiber fibrous reinforcement as a separate layer, which is proximal to, and in contact with, the fibrous reinforcement, but does not substantially impregnate the fibrous reinforcement. The prepreg, which is also referred to as semi-preg, is typically covered on both sides with a protective film and rolled up for storage and shipment at temperatures that are typically kept well below room temperature to avoid premature curing. The actual resin matrix is not formed until further processing of the semi-preg. Any of the other prepreg manufacturing processes and storage/shipping systems may be used if desired.

The fibrous portion of the prepreg, which is also referred to as the fibrous reinforcement or fibrous support, may be selected from any fiberglass, carbon or aramid (aromatic polyimide) fibers. The fibrous reinforcement is preferably carbon fibers. Preferred carbon fibers are in the form of tows that contain from 3,000 to 50,000 carbon filaments (3K to 50K). Commercially available carbon fiber tows that contain 6,000, 12,000 or 24,000 carbon filaments (6K, 12K or 24K) are preferred.

The fibrous portion of the prepreg may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg that is used to form sheet molding compound. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Les Avenieres, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The following exemplary resin formulation is impregnated into a fibrous support, to form a prepreg in accordance with the present invention (all weight percentages are based on the total resin weight):

22 wt % to 26 wt % triglycidyl-m-aminophenol; 22 wt % to 26 wt % tetrafunctional epoxy; 4 wt % to 8 wt % solid epoxy resin; 15 wt % to 19 wt % polyethersulfone; and 27 wt % to 32 wt % 3,3'-DDS as the curing agent.

The following is a preferred exemplary resin formulation where the given amount of each ingredient may be varied by ±1 wt % (all weight percentages are based on the total resin weight):

23.8 wt % triglycidyl-m-aminophenol; 23.8 wt % tetrafunctional epoxy; 6 wt % solid epoxy resin; 16.9 wt % polyethersulfone; and 29 wt % 3,3'-DDS as the curing argent.

The prepreg may be molded using any of the standard techniques used to form composite parts. Typically, one or more layers of prepreg are placed in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention are particularly well suited for use in making the composite parts and structures that are present in jet engine nacelles. The sub Tg of the uncured resin is suitable for use in making prepreg and the composite parts and structures that are molded from the prepreg are able to tolerate the hot and wet conditions present in the environment of a jet engine nacelle.

For the purposes of this specification, a composite part or structure is considered to be able to tolerate hot and wet conditions if the open hole compression (OHC) of the cured composite material of the part or structure is 37 of greater when measured at 132° C. under wet conditions (hot/wet OHC) as set forth in the current version of ASTM D6484. Preferably, the 132° C./wet OHC the cured composite material will be at least 38.

For the purposes of this specification, to be suitable for use as an uncured resin to make prepreg that is molded to form engine nacelle parts and structures, the sub Tg of the resin should be in the range of –10° C. to 5° C. as determined by differential scanning calorimetry (DSC) conducted at a heating rate of 10° C. per minute. Preferably, the sub Tg will be from –5° C. to 5° C. and most preferably between –0° C. and 5° C.

Examples of practice are as follows:

Example 1

A first preferred exemplary uncured resin formulation in accordance with the present invention is set forth in TABLE 1. The uncured resin was prepared by mixing the epoxy ingredients at room temperature with the polyethersulfone to form a resin blend that was heated to 120° C. for 60 minutes to completely dissolve the polyethersulfone. The mixture was cooled to 80° C. and the curing agent was added and mixed in thoroughly.

TABLE 1

| Ingredient | Amount (Wt %) |
|---|---|
| Trifunctional meta-glycidyl amine (MY0610) | 24.3 |
| N,N,N',N'-tetraglycidyl-4,4'-diaminodiphenyl methane (MY721) | 24.3 |
| Solid epoxy (Tactix 741) | 6.0 |
| Thermoplastic Toughening Agent (polyether sulfone - 5003P) | 16.9 |
| Aromatic diamine curing agent (3,3-DDS) | 28.5 |

The sub Tg of the resin was measured by DSC at a heating rate of 10° C./minute and found to be 12° C.

Exemplary prepreg was prepared by impregnating one or more layers of unidirectional carbon fibers with the resin formulation of TABLE 1. The unidirectional carbon fibers (12K AS4) available from Hexcel Corporation) were used to make a prepreg in which the matrix resin amounted to 35 weight percent of the total uncured prepreg weight and the fiber areal weight was 192 grams per square meter (gsm). A 26-ply laminate was prepared using standard prepreg fabrication procedures. The laminate was cured in an autoclave at 177° C. for about 2 hours. The cured laminate was tested to determine OHC in accordance with ASTM D6484 under room temperature/dry conditions 82° C./wet conditions: and 132° C./wet conditions. The results were 55.7, 45.4 and 38.6, respectively.

Example 2

A second preferred exemplary uncured resin having the formula set forth in TABLE 2 was prepared in the same manner as Example 1.

TABLE 2

| Ingredient | Amount (Wt %) |
|---|---|
| Trifunctional meta-glycidyl amine (MY0610) | 23.8 |
| N,N,N',N'-tetraglycidyl-4,4'-diaminodiphenyl methane (MY721) | 23.8 |
| Solid epoxy (SE 250) | 6.0 |
| Thermoplastic Toughening Agent (polyether sulfone - 5003P) | 16.9 |
| Aromatic diamine curing agent (3,3-DDS) | 29.5 |

The sub Tg of the resin was measured in the same manner as Example 1 and found to be 2.4° C.

A 26-ply laminate was prepared, cured and tested for OHC in the same manner as Example 1. The OHC's of the laminate under room temperature/dry conditions; 82° C./wet conditions; and 132° C./wet conditions were 54.3, 42.3 and 38.1 respectively.

Example 3

A third preferred exemplary uncured resin having the formula set forth in TABLE 3 was prepared in the same manner as Example 1.

TABLE 3

| Ingredient | Amount (Wt %) |
|---|---|
| Trifunctional meta-glycidyl amine (MY0610) | 23.8 |
| N,N,N',N'-tetraglycidyl-4,4'-diaminodiphenyl methane (MY721) | 23.8 |
| Solid epoxy (NC 7000H) | 6.0 |
| Thermoplastic Toughening Agent (polyether sulfone - 5003P) | 16.9 |
| Aromatic diamine curing agent (3,3-DDS) | 29.5 |

The sub Tg of the resin was measured in the same manner as Example 1 and found to be 2.6° C.

A 26-ply laminate was prepared, cured and tested for OHC in the same manner as Example 1. The OHC's of the laminate under room temperature/dry conditions; 82° C./wet conditions; and 132° C./wet conditions were 53.4, 45.0 and 37.8, respectively.

Example 4

A fourth preferred exemplary uncured resin having the formula set forth in TABLE 4 was prepared in the same manner as Example 1.

TABLE 4

| Ingredient | Amount (Wt %) |
|---|---|
| Trifunctional meta-glycidyl amine (MY0610) | 23.8 |
| N,N,N',N'-tetraglycidyl-4,4'-diaminodiphenyl methane (MY721) | 23.8 |
| Solid epoxy (HP 4770) | 6.0 |
| Thermoplastic Toughening Agent (polyether sulfone - 5003P) | 16.9 |
| Aromatic diamine curing agent (3,3-DDS) | 29.5 |

The sub Tg of the resin was measured in the same manner as Example 1 and found to be 2.4° C.

A 26-ply laminate was prepared, cured and tested for OHC in the same manner as Example 1. The OHC's of the laminate under room temperature/dry conditions; 82° C./wet conditions; and 132° C./wet conditions were 54.7, 44.9 and 37.1, respectively.

All of the preferred exemplary uncured resins are particularly well suited for making prepreg that is used in making the composite parts and structures that are present in jet engine nacelles because the uncured resins all had sub Tg's of between 2° C. and 3° C. and the laminates made from the resins all had an OHC under 132° C./wet conditions of between 37 and 39.

Comparative examples are as follows:

Comparative Examples 1-7

Comparative examples of uncured resin having the formulas set forth in TABLE 5 were prepared in the same manner as Example 1. 26-ply laminates were prepared, cured and tested for OHC in the same manner as Example 1. The uncured comparative resins were also tested for sub Tg in the same manner as Example 1. The results of the OHC and sub Tg testing are set forth in TABLE 5.

TABLE 5

| Ingredient | C1 (Wt %) | C2 (Wt %) | C3 (Wt %) | C4 (Wt %) | C5 (Wt %) | C6 (Wt %) | C7 (Wt %) |
|---|---|---|---|---|---|---|---|
| MY0610 | 26.2 | 26.6 | — | — | — | — | 36.6 |
| KDS 8808 | — | — | 26.2 | 26.6 | — | — | — |
| MY721 | 26.2 | — | 26.2 | — | 30.6 | 30.9 | — |
| MY9663 | — | 26.6 | — | 26.6 | — | — | — |
| Tactix 556 | — | — | — | — | — | — | 18.3 |
| SE 250 | — | — | — | — | 14.9 | 29.6 | — |
| HP 4770 | — | — | — | — | 14.9 | — | — |
| PES (5003P) | 16.9 | 16.9 | 16.9 | 16.9 | 15.0 | 15.0 | 17.0 |
| 3,3-DDS | 30.7 | 29.9 | 30.7 | 29.9 | 24.6 | 24.5 | 28.1 |
| Sub Tg (° C.) | −3.8 | 2.1 | −1.4 | −0.6 | 16.7 | 16.9 | −2.8 |
| OHC (RT/dry) | 52.9 | 54.0 | 55.2 | 55.0 | 55.0 | 54.1 | 51.0 |
| OHC (82° C./wet) | 43.9 | 44.0 | 43.6 | 44.3 | 46.3 | 45.5 | 42.0 |
| OHC (160° C./wet) | 36.6 | 35.2 | 36.9 | 35.9 | 39.1 | 39.2 | 37.0 |

Comparative Examples 1-4 demonstrate that a lack of solid epoxy resin in the resin formulation prevents one from reaching a the preferred sub Tg (0° C. to 5° C.) and/or suitable OHC (at least 37) under 132° C./wet conditions in accordance with the present invention. Comparative Examples 5-6 demonstrate that the addition of substantial amounts of solid epoxy (over 10 weight percent) provide a suitable OHC under 132° C./wet conditions, but the sub Tg (almost 17° C.) is significantly above the preferred sub Tg range in accordance with the present invention that is suitable for making nacelle prepreg.

The laminate prepared according to Example 4 was also tested for OHC under 160° C./wet conditions in accordance with ASTM D6484. The OHC under 160° C./wet conditions was 34.0, which is particularly high and unexpected in view of the OHC of Comparative Example 7 under 160° C./wet conditions, which was found to be only 22.0. Tactix 556, which is used in Comparative Example 7, is a hydrocarbon epoxy novolac resin having a dicyclopentadiene backbone that is available from Huntsman (The Woodlands, Tex.). Tactix 556 is a semi-solid resin which has a softening point of 53° C.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

In accordance with the present invention, small amounts of thermoplastic particles (1 to 5 wt %, based on the total weight of the uncured resin) are included in the uncured resin as a thermoplastic particle component to provide increased interlaminar fracture toughness. The amount of triglycidyl aminophenol epoxy resin is 23 to 27 weight percent, based on the total weight of the uncured resin and the amount of tetrafunctional epoxy resin is 23 to 27 weight percent, based on the total weight of the uncured resin. Preferably, the amount of thermoplastic particles in the thermoplastic particle component will be 3 wt %±1 wt %, based on the total weight of the uncured resin.

One or more types of thermoplastic particles may be included in the uncured resin to form the thermoplastic particle component. Exemplary thermoplastic particles are polyamide particles which are formed from the polymeric condensation product of a methyl derivative of bis(4-aminocyclohexyl)methane and an aliphatic dicarboxylic acid selected from the group consisting of decane dicarboxylic acid and dodecane dicarboxylic acid. Methyl derivatives of bis(4-aminocyclohexyl)methane, which are referred to herein as the "amine component" are also known as methyl derivatives of 4,4'-diaminocyclohexylmethane. This type of polyimide particle and the methods for making them are described in detail in U.S. Pat. Nos. 3,936,426 and 5,696,202, the contents of which are hereby incorporated by reference.

The formula for the amine component of the polymeric condensation product is

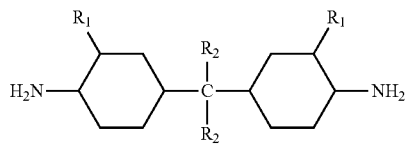

where $R_2$ is hydrogen and $R_1$ is either methyl or hydrogen.

The formula for the monomeric unit of the polymeric condensation product may be represented as follows:

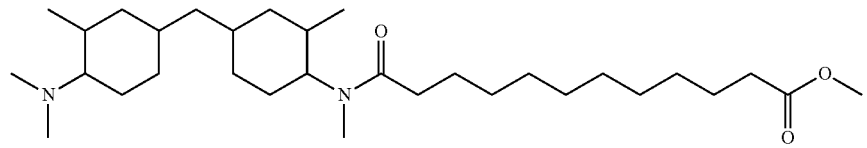

The molecular number of the polymeric condensation product will range from 14,000 to 20,000 with a molecular numbers of about 17,000 being preferred.

The polyamide particles should have particle sizes of below 100 microns. It is preferred that the particles range in size from 5 to 60 microns and more preferably from 10 to 30 microns. It is preferred that the average particle size is from 15 to 25 microns. The polyamide particles may be regular or irregular in shape. For example, the particles may be substantially spherical or they can be particles with a jagged shape.

One exemplary polyamide particle is made from polyamide where the amine component of the polymeric condensation product has the above formula in which $R_1$ both are methyl and $R_2$ both are hydrogen. Such polyamide particles may be made from the polymeric condensation product of 3,3'-dimethyl-bis(4-aminocyclohexyl)-methane and 1,10-decane dicarboxylic acid. The polyamide particles are made by combining, in a heated receiving vessel, 13,800 grams of 1,10-decade dicarboxylic acid and 12,870 grams of 3,3'-dimethyl-bis(4-aminocyclohexyl)methane with 30 grams of 50% aqueous phosphoric acid, 150 grams benzoic acid and 101 grams of water. The mixture is stirred in a pressure autoclave until homogeneous. After a compression, decompression and degassing phase, the polyamide condensation product is pressed out as a strand, passed under cold water and granulated to form the polyamide particles. Polyamide particles where $R_1$ both are methyl and $R_2$ both are hydrogen can also be made from GRILAMID TR90, which is commercially available from EMS-Chime (Sumter, S.C.). GRILAMID TR90 is the polymeric condensation product of 3,3'-dimethyl-bis(4-aminocyclohexyl)-methane and 1,10-decane dicarboxylic acid.

Another exemplary polyamide particle is made from polyamide where the amine component of the polymeric condensation product has the above formula in which $R_1$ both are hydrogen and $R_2$ both are hydrogen. Such polyamide particles may be made in the same manner as described above, except that polyamide is the polymeric condensation product of 3,3'-dimethyl-bis(4-aminocyclohexyl)-propane and 1,10-decane dicarboxylic acid. Polyamide particles where $R_1$ both are hydrogen and $R_2$ both are hydrogen can also be made from TROGAMIDE CX7323 or CX9705, which are commercially available from Evonik (Mobile, Ala.). CX7323 and CX9705 are the polymeric condensation products of 3,3'-dimethyl-bis(4-aminocyclohexyl)-propane and 1,10-decane dicarboxylic acid.

The thermoplastic particle component may include one or more types of polyamide particles that are typically used in thermoplastic toughened epoxy resins including, for example, polyamide (PA) 11, PA6, PA12, PA6/PA 12 copolymer, PA4, PA8, PA6.6, P A4.6, PA10.10, PA6.10 and PA10.12.

An exemplary thermoplastic particle component contains a first group of polyamide particles which do not contain crosslinked polyamide and a second group of polyamide particles that do contain crosslinked polyamide.

The first group of polyamide particles may be any of the polyamide particle that do not contain crosslinked polyamide and which are typically used in thermoplastic toughened epoxy-based prepreg. Such particles may be composed of polyamide (PA) 11, PA6, PA12, PA6/PA12 copolymer, PA4, PA8, PA6.6, PA4.6, PA10.10, PA6.10 and PA10.12. Non-crosslinked polyamide particles are available commercially from a number of sources. Suitable non-crosslinked polyamide 12 particles are available from Kobo Products under the trade name SP10L. SP10L particles contain over 98 wt % PA 12. The particle size distribution is from 7 microns to 13 microns with the average particle size being 10 microns. The density of the particles is 1 g/cm³. It is preferred that the PA12 particles are at least 95 wt % PA12, excluding moisture content.

Other suitable non-crosslinked particles are available from Arkema (Colombes, France) under the tradenames Orgasol 1002 powder and Orgasol 3803 powder. Orgasol 1002 powder is composed of 100% PA6 particles having an average particle size of 20 microns. Orgasol 3803 is composed of particles that are a copolymer of 80% PA12 and 20% PA6 with the mean particle size being from 17 to 24 microns. Orgasol 2002 is a powder composed of non-crosslinked PA12 particles that may also be used in the first group of particles.

Exemplary non-crosslinked polyamide particles for the first group of thermoplastic particles are polyamide 11 particles, which are also available commercially from a number of sources. The preferred polyamide 11 particles are available from Arkema (Colombes, France) under the trade name Rislan PA11. These particles contain over 98 wt % PA 11 and have a particle size distribution of 15 microns to 25 microns. The average particle size is 20 microns. The density of the Rislan PA11 particles is 1 g/cm³. It is preferred that the PA 11 particles are at least 95 wt % PA11, excluding moisture content.

The second group of thermoplastic polyamide particles are particles that contain crosslinked polyamide on the surface of the particle, in the interior of the particle or both. The crosslinked polyamide particles may be made from polyamide that has been crosslinked prior to particle formation or non-crosslinked polyamide particles may be treated with suitable crosslinking agents to produce crosslinked polyamide particles.

Suitable crosslinked particles contain crosslinked PA11, PA6, PA12, PA6/PA12 copolymer, PA4, PA8, PA6.6, PA4.6, PA10.10, PA6.10 and PA10.12. Any of the crosslinking agents commonly used to cross link polyamide are suitable. Exemplary crosslinking agents are epoxy-based crosslinking agents, isocyanate-based crosslinking agents, carbodiimide-based crosslinking agents, acyllactam-based crosslinking agents and oxazoline-based crosslinking agent. Preferred crosslinked particles are PA12 particles that contain PA12 that has been crosslinked with an epoxy crosslinking agent. The procedures used to cross link thermoplastic polymers, including polyamide, are known. For examples, see U.S. Pat. Nos. 6,399,714, 8,846,818 and U.S. Published Patent Application US 2016/0152782 A1. The contents of these three references are hereby incorporated by reference.

Crosslinked PA12 particles are available commercially from Arkema (Colombes, France) under the tradename ORGASOL 2009 polyamide powder, which is also known as CG352. The PA12 particles present in ORGASOL 2009 polyamide powder are composed of at least 40% PA12 that has been cross linked with an epoxy-based crosslinking agent. The ORGASOL 2009 crosslinked polyamide particles have an average particle size of 14.2 microns with only 0.2% of the particles having a diameter of greater than 30 microns. The melting point of ORGASOL 2009 crosslinked particles is 180° C. The specific surface area of the ORGASOL 2009 particles is 1.9 and the moisture content of the particles is 0.34%.

The crosslinked polyamide particles should each contain from 40 to 70% crosslinked polyamide. Preferably, the crosslinked polyamide particles should each contain from 40 to 60% crosslinked polyamide.

Preferably, both the non-crosslinked and crosslinked polyamide particles should have particle sizes of below 100 microns. It is preferred that the particles range in size from 5 to 60 microns and more preferably from 5 to 30 microns. It is preferred that the average particle size is from 5 to 20 microns. The particles may be regular or irregular in shape. For example, the particles may be substantially spherical or they can be particles with a jagged shape. It is preferred that the non-crosslinked particles have an average particle size that is larger than the crosslinked particles. Preferably, the average non-crosslinked particles size will range from 15 to 25 microns and the average crosslinked particle size will range from 10 to 20 microns.

The relative amounts of non-crosslinked and crosslinked particles may be varied when a combination of crosslinked and non-crosslinked particles are used. Weight ratios of non-crosslinked particles to crosslinked particles may range from 4:1 to 1.5:1. Preferably, the weight ratios of non-crosslinked particles to crosslinked particles will range from 3.5:1 to 2.5:1.

Another exemplary thermoplastic particle component may include a combination of polyimide particles and polyamide particles where the polyamide particles are composed of the polymeric condensation product of a methyl derivative of bis(4-aminocyclohexyl)methane and an aliphatic dicarboxylic acid.

Preferred polyimide particles are available commercially from FTP Polymer GmbH (Lenzig, Austria) as P84 polyimide molding powder. Suitable polyamide particles are also available commercially from Evonik Industries (Austria) wider the tradename P84NT. The polyimide used to make the particles is disclosed in U.S. Pat. No. 3,708,458, the contents of which is hereby incorporated by reference. The polyimide is made by combining benzophenone-3,3',4,4'-tetracarboxylic acid diaithydride with a mixture of 4,4'-methylenebis(phenyl isocyanate) and toluene diisocyanate (2,4- or 2,6-isomer). The amine analogs may be used in place of the aromatic iso- and diisocyanates. The CAS Registry No. of the polyimide is 58698-66-1.

The polyimide particles are composed of an aromatic polyimide having the repeating monomer formula:

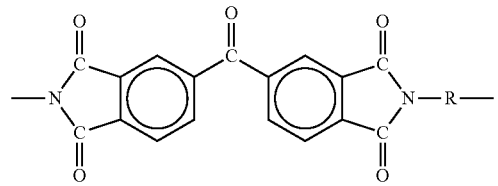

where from 10 to 90% of the R groups in the overall polymer are an aromatic group having the formula:

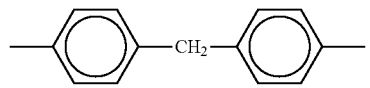

with the remaining R groups in the polymer being

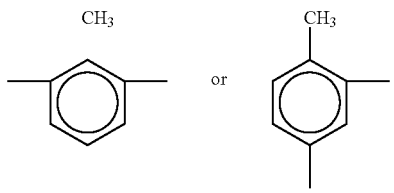

The size of the polyimide particles in the powder typically ranges from 2 microns to 35 microns. A preferred polyimide powder will contain particles that range in size from 2 to 30 microns with the average particle size ranging from 5 microns to 15 microns. Preferably, at least 90 weight percent of the polyimide particles in the powder will be in the size range of 2 microns to 20 microns. The polyimide particles may be regular or irregular in shape. For example, the particles may be substantially spherical or they can be particles with a jagged shape.

The polyimide particles contain at least 95 weight percent polyimide. Small amounts (up to 5 weight percent) of other materials may be included in the particles provided that they do not adversely affect the overall characteristics of the particles.

The glass transition temperature (Tg) of the polyimide particles should be about 330° C. with the density of individual particles being 1.34 grams per cubic centimeter. The linear coefficient of thermal expansion of the particles is 50.

The weight ratio between the polyamide particles and the polyimide particles may range from 3.5:1.0 to 1.0:1.0. Preferably, the weight ratio between the polyamide particles and polyimide particles is between 3.2:1.0 and 2.8:1.0.

Examples of practice with respect to the inclusion of a thermoplastic particle component in the uncured resin are as follows:

Example 5

A preferred exemplary uncured resin having the formula set forth in TABLE 5 was prepared in the same manner as Example 1, except that a thermoplastic particle component (particles of CX9705 having particles sizes less than 20 microns with an average particle size of 5 microns) was mixed in with the uncured resin at the same time as the curing agent.

TABLE 5

| Ingredient | Amount (Wt %) |
| --- | --- |
| Trifunctional para-glycidyl amine (MY0510) | 25.8 |
| N,N,N',N'-tetraglycidyl-4,4'-diaminodiphenyl methane (MY721) | 25.8 |
| Solid epoxy (HP 4770) | 6.0 |
| Thermoplastic Toughening Agent (polyether sulfone - 5003P) | 13.9 |
| Thermoplastic Particle Component (CX9705 particles) | 3.0 |
| Aromatic diamine curing agent (3,3-DDS) | 25.5 |

Exemplary prepreg was prepared by impregnating one or more layers of carbon fiber fabric with the resin formulation of TABLE 5. The carbon fiber fabric (AS4D carbon fiber fabric, available from Hexcel Corporation, Dublin, Calif.) was used to make a prepreg in which the matrix resin amounted to 35 weight percent of the total uncured prepreg weight and the carbon fiber areal weight was 193 grams per square meter (gsm). A 20-ply laminate was prepared using standard prepreg fabrication procedures. The laminate was cured in an autoclave at 177° C. for about 2 hours. The cured laminate, which was 0.16±0.01 inch thick, was tested to determine G1c in accordance with the current version of BSS 7273.

The G1c was found to be 4.0 in-lb/in$^2$. The sub Tg of the uncured resin was −5.8° C. The resin set forth in Example 4, which lacks thermoplastic particles, was used to make prepreg that was equivalent to Example 5 and subjected to the same G1c testing procedure. The G1c of the Example 4 prepreg was 2.8 in-lb/in$^2$.

Example 6

An exemplary uncured resin having the formula set forth in TABLE 6 was prepared in the smile manner as Example 5.

TABLE 6

| Ingredient | Amount (Wt %) |
| --- | --- |
| Trifunctional meta-glycidyl amine (MY0610) | 25.8 |
| N,N,N',N'-tetraglycidyl-4,4'-diaminodiphenyl methane (MY721) | 25.8 |
| Solid epoxy (HP 4770) | 6.0 |
| Thermoplastic Toughening Agent (polyether sulfone - 5003P) | 14.9 |
| Thermoplastic Particle Component (CX9705 particles) | 2.0 |
| Aromatic diamine curing agent (3,3-DDS) | 25.5 |

Prepreg and laminates were prepared and cured in the same manner as Example 5 and tested for G1c. The G1c was found to be 3.2 in-lb/in$^2$. The sub Tg of the uncured resin was 2.0° C.

Example 7

An exemplary uncured resin having the formula set forth in TABLE 7 was prepared in the same manner as Example 5.

TABLE 7

| Ingredient | Amount (Wt %) |
| --- | --- |
| Trifunctional para-glycidyl amine (MY0510) | 25.8 |
| N,N,N',N'-tetraglycidyl-4,4'-diaminodiphenyl methane (MY721) | 25.8 |
| Solid epoxy (HP 4770) | 6.0 |
| Thermoplastic Toughening Agent (polyether sulfone - 5003P) | 14.9 |
| Thermoplastic Particle Component (CX9705 particles particles) | 2.0 |
| Aromatic diamine curing agent (3,3-DDS) | 25.5 |

Prepreg and laminates were prepared and cured in the same manner as Example 5 and tested for G1c. The G1c was found to be 3.5 in-lb/in$^2$. The sub Tg was −5.3° C.

Example 8

An exemplary uncured resin having the formula set forth in TABLE 8 was prepared in the same manner as Example 5, except that Rislan PA11 particles were used in place of CX9705 particles.

TABLE 8

| Ingredient | Amount (Wt %) |
| --- | --- |
| Trifunctional meta-glycidyl amine (MY0610) | 25.8 |

TABLE 8-continued

| Ingredient | Amount (Wt %) |
| --- | --- |
| N,N,N',N'-tetraglycidyl-4,4'-diaminodiphenyl methane (MY721) | 25.8 |
| Solid epoxy (HP 4770) | 6.0 |
| Thermoplastic Toughening Agent (polyether sulfone - 5003P) | 13.9 |
| Thermoplastic Particle Component (Rislan PA-11 particles) | 3.0 |
| Aromatic diamine curing agent (3,3-DDS) | 25.5 |

Prepreg and laminates were prepared and cured in the same manner as Example 5 and tested for G1c. The G1c was found to be 3.02 in-lb/in$^2$. The sub Tg of the uncured resin was −3.2° C.

Example 9

An exemplary uncured resin having the formula set forth in TABLE 9 was prepared in the same manner as Example 8.

TABLE 9

| Ingredient | Amount (Wt %) |
| --- | --- |
| Trifunctional meta-glycidyl amine (MY0610) | 25.8 |
| N,N,N',N'-tetraglycidyl-4,4'-diaminodiphenyl methane (MY721) | 25.8 |
| Solid epoxy (HP 4770) | 6.0 |
| Thermoplastic Toughening Agent (polyether sulfone - 5003P) | 14.9 |
| Thermoplastic Particle Component (Rislan PA-11 particles) | 2.0 |
| Aromatic diamine curing agent (3,3-DDS) | 25.5 |

Prepreg and laminates were prepared and cured in the same manner as Example 5 and tested for G1c. The G1c was found to be 3.03 in-lb/in$^2$. The sub Tg of the uncured resin was −3.4° C.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A prepreg that is curable to form a composite material, said prepreg comprising:
   A) fibers; and
   B) an uncured resin comprising:
   a) an epoxy resin component comprising:
   1) 23 to 27 weight percent triglycidyl aminophenol epoxy resin, based on the total weight of said uncured resin;
   2) 23 to 27 weight percent tetrafunctional epoxy resin, based on the total weight of said uncured resin;
   3) 4 to 8 weight percent solid epoxy resin, based on the total weight of said uncured resin wherein said solid epoxy resin is selected from the group of solid epoxy resins having the following formulas:

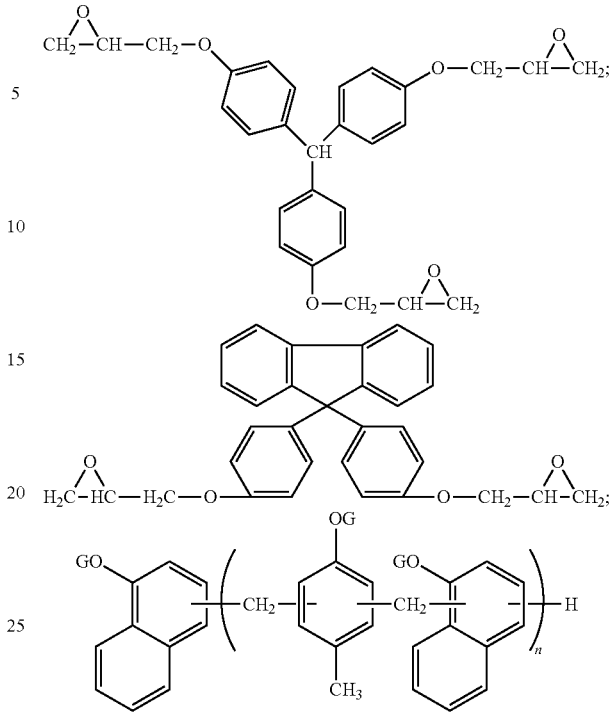

where G is a glycidyl or epoxide group and n=1.5 to 2; and

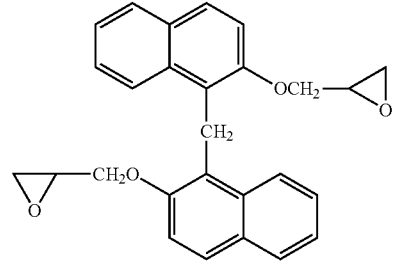

b) 12 to 16 weight percent polyethersulfone, based on the total weight of said uncured resin;
   c) 1 to 5 weight percent of a thermoplastic particle component, based on the total weight of said uncured resin; and
   d) a sufficient amount of a curing agent to provide curing of said uncured resin to form said composite material.

2. A prepreg according to claim 1 wherein said tetrafunctional epoxy resin is N,N,N',N'-tetraglycidyl-4,4'-diaminodiphenyl methane.

3. A prepreg according to claim 2 wherein said triglycidyl aminophenol epoxy resin is triglycidyl para-aminophenol epoxy resin.

4. A prepreg according to claim 1 wherein said triglycidyl aminophenol epoxy resin is triglycidyl para-aminophenol epoxy resin.

5. A prepreg according to claim 1 wherein the weight ratio of said triglycidyl aminophenol epoxy resin to said tetrafunctional epoxy resin is 1:1.

6. A prepreg according to claim 1 wherein said curing agent is an aromatic amine.

7. A prepreg according to claim 6 wherein said aromatic amine is 3,3'-diaminodiphenyl sulphone.

8. A composite part or structure that has been formed by curing a prepreg according to claim 1.

9. A composite part or structure according to claim 8 wherein said composite part or structure forms at least part of an aircraft engine nacelle.

10. A method for making a composite part or structure comprising the steps of providing a prepreg according to claim 1 and curing said prepreg to form said composite part or structure.

11. A method for making a prepreg that is curable to form a composite material, said method comprising the steps of:
A) providing fibers; and
B) impregnating said fibers with an uncured resin comprising:
a) an epoxy resin component comprising:
1) 23 to 27 weight percent triglycidyl aminophenol epoxy resin, based on the total weight of said uncured resin;
2) 23 to 27 weight percent tetrafunctional epoxy resin, based on the total weight of said uncured resin;
3) 4 to 8 weight percent solid epoxy resin, based on the total weight of said uncured resin wherein said solid epoxy resin is selected from the group of solid epoxy resins having the following formulas:

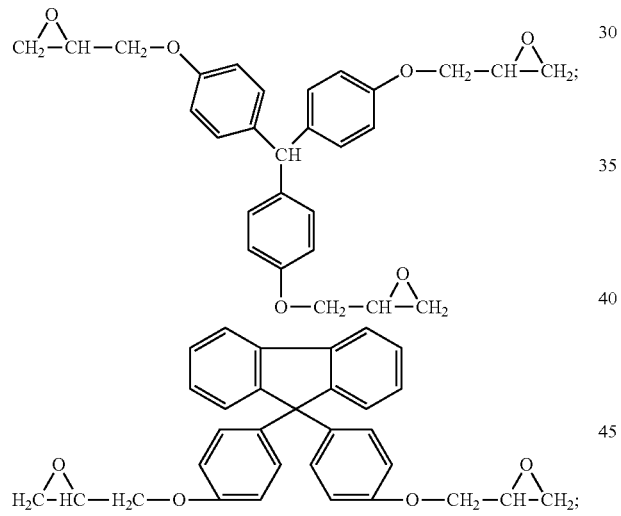

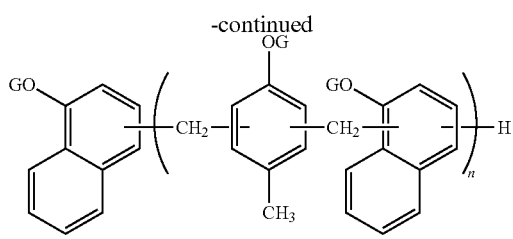

where G is a glycidyl or epoxide group and n=1.5 to 2; and

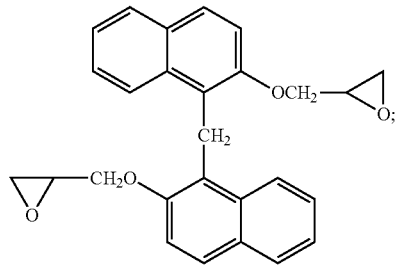

b) 12 to 16 weight percent polyethersulfone, based on the total weight of said uncured resin;
c) 1 to 5 weight percent of a thermoplastic particle component, based on the total weight of said uncured resin; and
d) a sufficient amount of a curing agent to provide curing of said uncured resin to form said composite material.

12. A method for making a prepreg according to claim 11 wherein said tetrafunctional epoxy resin is N,N,N',N'-tetraglycidyl-4,4'-diaminodiphenyl methane.

13. A method for making a prepreg according to claim 11 wherein said triglycidyl aminophenol epoxy resin is triglycidyl para-aminophenol epoxy resin.

14. A method for making a prepreg according to claim 11 wherein said curing agent is an aromatic amine.

15. A method for making a prepreg according to claim 14 wherein said aromatic amine is 3,3'-diaminodiphenyl sulphone.

* * * * *